(12) United States Patent
Wang et al.

(10) Patent No.: US 7,803,425 B2
(45) Date of Patent: Sep. 28, 2010

(54) THREE DIMENSIONAL NANO-POROUS FILM AND FABRICATION METHOD THEREOF

(75) Inventors: Wu-Jing Wang, Hsinchu (TW); Yen-Po Wang, Taipei (TW); Yun-Ching Lee, Ji-An Township (TW); Joung-Yei Chen, Sindian (TW); Hsi-Hsin Shih, Taichung (TW); Hsein-Pin Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 83 days.

(21) Appl. No.: 11/212,728

(22) Filed: Aug. 29, 2005

(65) Prior Publication Data
US 2006/0046045 A1  Mar. 2, 2006

(30) Foreign Application Priority Data
Aug. 31, 2004  (TW) ............................... 93126155 A

(51) Int. Cl.
*B05D 5/00* (2006.01)
*B05D 3/10* (2006.01)

(52) U.S. Cl. ........................................ 427/245; 427/336
(58) Field of Classification Search ................ 427/243, 427/245, 336
See application file for complete search history.

(56) References Cited

U.S. PATENT DOCUMENTS

| | | | |
|---|---|---|---|
| 5,321,102 A * | 6/1994 | Loy et al. ................... 525/474 |
| 5,624,875 A * | 4/1997 | Nakanishi et al. ............. 501/39 |
| 5,725,959 A | 3/1998 | Terada et al. |
| 5,770,275 A * | 6/1998 | Raman et al. ................ 427/535 |
| 6,057,080 A | 5/2000 | Brunsvold et al. |
| 6,132,928 A | 10/2000 | Tanabe et al. |
| 6,207,098 B1 * | 3/2001 | Nakanishi et al. ........... 264/414 |
| 6,465,148 B1 | 10/2002 | Kang et al. |
| 6,605,229 B2 * | 8/2003 | Steiner et al. .................. 216/24 |
| 6,911,192 B2 * | 6/2005 | Nakanishi .................... 423/338 |
| 2002/0086934 A1 | 7/2002 | Kawaguchi et al. |
| 2002/0122962 A1 | 9/2002 | Arfsten et al. |
| 2005/0158591 A1 | 7/2005 | Arfsten et al. |

FOREIGN PATENT DOCUMENTS

| JP | 2002-341106 | 11/2002 |
|---|---|---|
| WO | WO 03/52003 | 6/2003 |

* cited by examiner

*Primary Examiner*—William Phillip Fletcher, III
(74) *Attorney, Agent, or Firm*—Birch, Stewart, Kolasch & Birch, LLP

(57) ABSTRACT

A nanoporous film and fabrication method thereof. The method for fabricating nanoporous film comprising: providing a substrate with a surface; forming a coating of a composition on the surface, curing the coating to polymerize the oxide gel, thereby forming an organic/inorganic hybrid film; and dissolving the template from the organic/inorganic hybrid film by an organic solvent. Specifically, the composition comprises the following components: an oxide gel, a template and an initiator.

9 Claims, 2 Drawing Sheets

THREE DIMENSIONAL NANO-POROUS FILM AND FABRICATION METHOD THEREOF

This Non-provisional application claims priority under 35 U.S.C. §119(a) on Patent Application No. 093126155 filed in Taiwan, R.O.C. on Aug. 31, 2004, the entire contents of which are hereby incorporated by reference.

BACKGROUND

The present invention relates to a nanoporous film and fabrication method thereof, and more particularly to a nanoporous film with superior mechanical strength and antireflectivity.

Antireflection film is generally disposed on an outermost surface of an image display device such as optical lens, cathode ray tube display device (CRT), plasma display panel (PDP), liquid crystal display device (LCD), or organic electroluminescent device, to reduce reflectance so as to prevent optical interference from external light.

Single-layer antireflection film provides high yield, simple fabrication process, and low cost, making them a popular display industry choice. Antireflection film of conventional organic compounds containing fluorine used in multi-layer antireflection films, such as CaF2, or MgF2, cannot, however, achieve sufficiently high scratch resistance due to the poor cohesion of fluorine-containing compounds. Thus, a hard coat layer is formed thereon. Furthermore, the antireflection film made thereby has a sufficient refractive index of only 520 to 570 nm, and refractive index thereof cannot be further reduced to 1.40 or less.

A conventional single-layer antireflection film with a wave-shaped profile has been disclosed, providing lower refractive index, with fabrication thereof comprising a blend of tetramethoxysilane (TMOS) and a mutually incompatible polymer dissolved in a solvent to provide a solution with a common intermixed phase, and a substrate coated with the solution. After curing the coating, the TMOS undergoes a cross-link reaction to form TMOS condensation. Finally, the mutually incompatible polymer is removed from the coating, forming an antireflection film with a wave-shaped profile. Since the antireflection film has a plurality of vertical openings of differing depths, the antireflection film has a gradient refractive index, further obtaining a low reflectance. The antireflection film consists of the TMOS condensation, with scratch resistance of the antireflection film depending on bond strength thereof, i.e. bond strength of Si—O—Si bonds. Due to the low cross-link density of the TMOS condensation, the antireflection film, however, exhibits inferior mechanical strength and scratch resistance failing to meet the demands of the flat panel display industry.

Therefore, it is necessary to develop an antireflection film with low refractive index and high mechanical strength.

SUMMARY

The invention provides a nanoporous film having a plurality of three-dimensional nanopores distributed uniformly thereover. When the nanopores are sufficiently filled by air, the nanoporous film has a refractive index less than 1.45. Further, the nanoporous film, comprising organic/inorganic hybrid with high cross-link density, exhibits superior mechanical strength and scratch resistance.

The nanoporous film comprises the product fabricated as follows. A coating of a composition is formed on a substrate, the composition comprising the following components as a uniform solution in a first organic solvent: an oxide gel, having polymerizable groups, in an amount of 45 to 95 parts by weight; a template in an amount of 5 to 55 parts by weight; and an initiator in an amount of 1 to 10 parts by weight, based on 100 parts by weight of the oxide gel and the template. The oxide gel comprises an oxide gel of Group IIIB element, an oxide gel of Group IVB element, an oxide gel of Group IVB element, a silica gel, or metal oxide gel. The coating is cured, and the oxide gel is polymerized to a dry film. A second organic solvent dissolves the template from the dry film to leave an organic/inorganic hybrid film with three-dimensional nanopores. The nanoporous film can be 50~500 nm thick, preferably 50~300 nm thick, and the diameter of the nanopores can be 5~80 nm.

The nanoporous film, exhibiting reflectivity less than 2.0%, a transparency of more than 93%, a haze of 0.135%, a pencil hardness exceeding F, can serve as an antireflection film, and can be fabricated by the following steps. A coating of a composition is formed on a substrate, wherein the composition comprises the following components as a uniform solution in a first organic solvent: an oxide gel, having polymerizable groups, in an amount of 45 to 95 parts by weight; a template in an amount of 5 to 55 parts by weight; and an initiator in an amount of 1 to 10 parts by weight, based on 100 parts by weight of the oxide gel and the template. The oxide gel comprises an oxide gel of Group IIIB element, an oxide gel of Group IVB element, an oxide gel of Group IVB element, a silica gel, or metal oxide gel. The coating is cured, and the oxide gel is polymerized to a dry film. A second organic solvent dissolves the template from the dry film to leave an organic/inorganic hybrid film with three-dimensional nanopores. The antireflection film can be disposed on an outermost surface of an image display device such as an optical lens, a cathode ray tube display device (CRT), a plasma display panel (PDP), a liquid crystal display device (LCD), or an organic electroluminescent device, to reduce reflectance so as to prevent optical interference caused by external light.

A detailed description is given in the following with reference to the accompanying drawing.

BRIEF DESCRIPTION OF THE DRAWINGS

The invention can be more fully understood by reading the subsequent detailed description in conjunction with the examples and references made to the accompanying drawings, wherein.

DETAILED DESCRIPTION

A method for fabricating nanaporous film with three-dimensional nanopores is described in detail as following. First, a substrate with a surface is provided. The substrate can be a transparent substrate, such as a glass, plastic, or ceramic substrate. Next, a coating of an oxide gel composition is formed on the surface of the substrate. The oxide gel composition comprises an oxide gel having polymerizable groups, a template, and an initiator as a uniform solution in a first organic solvent. The oxide gel, template, and initiator are respectively in an amount of 45~95 parts by weight, 5 to 55 parts by weight, and 1 to 10 parts by weight, based on 100 parts by weight of the oxide gel resin and the template. Particularly, the oxide gel having polymerizable groups can be an oxide gel of Group IIIB element, an oxide gel of Group IVB element, an oxide gel of Group IVB element, a silica gel, metal oxide gel or combinations thereof, and the polymerizable group can be alkenyl group, acrylic group, acryloyl group, epoxy group, amine group, alkoxy group, or isocyanato group.

Figure 1:
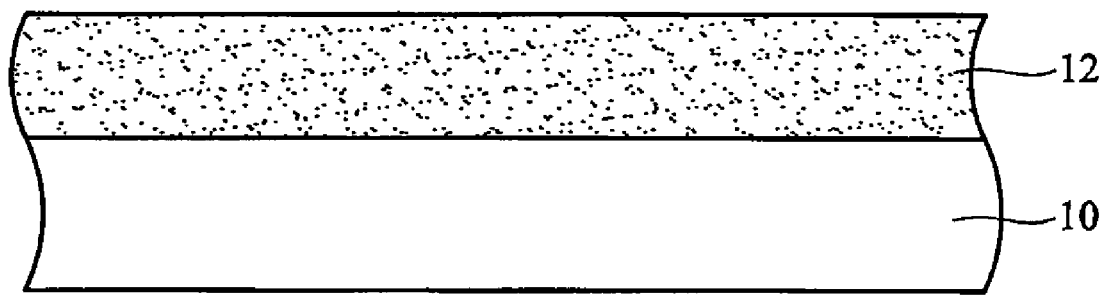
FIG. 1 is a cross section of nanoporous film according to an embodiment of the invention.
Figure 2:
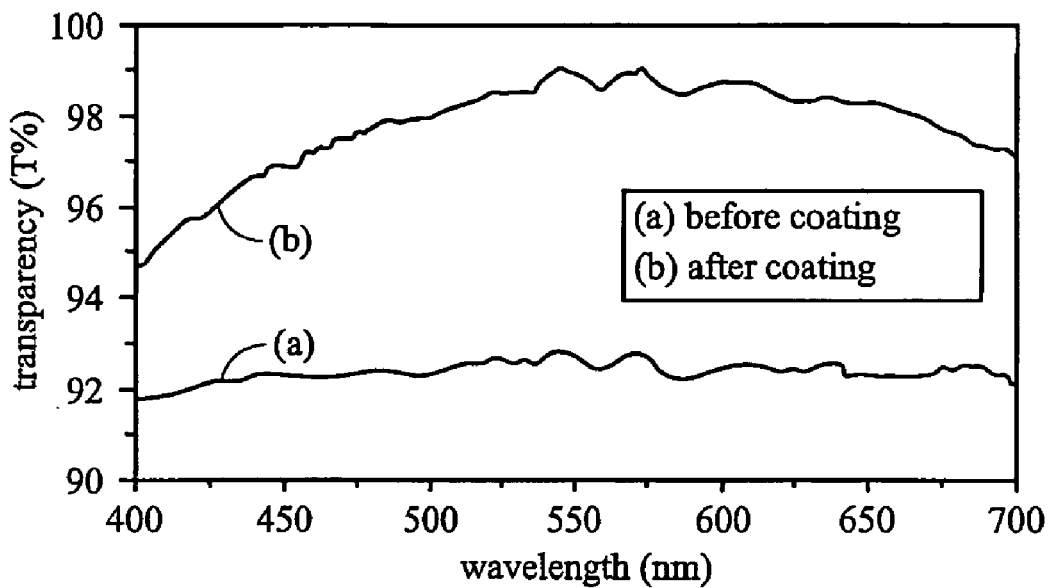
FIG. 2 is a graph plotting transparency against wavelength of the nanoporous film according to Example 5.
Figure 3:
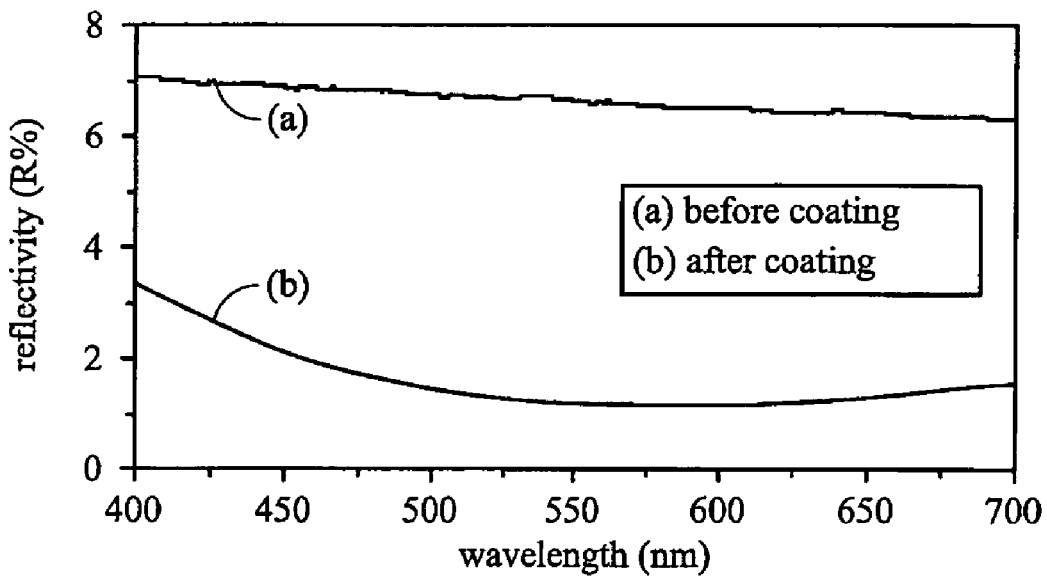
FIG. 3 is a graph plotting reflectivity against wavelength of the nanoporous film according to Example 5.

Next, the coating is cured to form a dry film, with particles of the template dispersed uniformly thereover, by heating or exposure to an actinic ray. Next, a second organic solvent dissolves the template from the dry film, with an organic/inorganic hybrid film with three-dimensional nanopores remaining. FIG. 2 shows a cross section of a nanoporous film 12 according to an embodiment of the invention disposed on a substrate 10.

The composition can be coated on the substrate by spin coating, dip coating, roll coating, printing, embossing, stamping, or spray coating.

According to the invention, the oxide gel can comprise condensation products or mixtures of at least one oxide gel precursor. Particularly, the at least one oxide gel precursor comprises a first oxide gel precursor having polymerizable groups. The first oxide gel precursor has a formula (I):

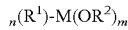
$$_n(R^1)\text{-}M(OR^2)_m$$

Wherein, n and m are an integer equal to or more than 1, and the sum of n and m is equal to or more than 2, preferably 4. M is an element of Group IIIB, element of Group IVB, element of Group VB, or transition metal and can be Si, Sn, Al, Zr, Ti, or Sb, preferably Si, Al, or Sn, more preferably Si. $R^1$ can be the same or different and is alkenyl group, acrylic group, acryloyl group, epoxy group, amine group, alkoxy group, or isocyanato group. $R^2$ can be the same or different and is alkyl group or haloalkyl group. Accordingly, the first oxide gel precursor can be 3-methacrylicoxy propyl trimethoxy silane (MPTS), glycidoxy triethoxysilane, 3-thiocyanatopropyl triethoxy silane, 3-amino-propyltriethoxysilane, glycidyloxypropyl triethoxy silane, tetraethoxy silane, vinyl triethoxy silane (VTES), vinyl trimethoxy silane, or combinations thereof.

Furthermore, the at least one oxide gel precursor can further comprise a second oxide gel precursor with a formula (II):

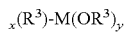
$$_x(R^3)\text{-}M(OR^3)_y$$

x is an integer equal to or more than 0, and y is an integer equal to or more than 1. The sum of x and y is equal to or more than 2, preferably 4. M is element of Group IIIB ~VB, or transition metal and can be Si, Sn, Al, Zr, Ti, or Sb, preferably Si, Al, or Sn, more preferably Si. $R^3$ can be the same or different and alkyl group or haloalkyl group. Accordingly, the second oxide gel precursor can be tetramethoxysilane (TMOS), tetraethoxysilane (TEOS), methyl triethoxysilane (MTES), dimethyl dimethoxysilane, ethyl triethoxysilane, tetrapropoxysilane (TPOS), tetrabutoxysilane (TBOS), or combinations thereof.

The initiator can be a photo initiator or a thermal initiator, such as peroxide or azo initiator, which generates, upon activation, free radical species through decomposition, and can be 2,2'-azobis(2-cyano-2-butane), dimethyl 2,2'-azobis(methyl isobutyrate), 4,4'-azobis(4-cyanopentanoic acid), 4,4'-azobis(4-cyanopentan-1-ol), 1,1'-azobis(cyclohexane carbonitrile), 2-(t-butylazo)-2-cyanopropane, 2,2'-azobis[2-methyl-(N)-(1,1)-bis(hydroxymethyl)-2-hydro xyethyl] propionamide, 2,2'-azobis[2-methyl-N-hydroxyethyl)] propionamide, 2,2'-azobis(N,N'-dimethyleneisobutyramidine) dihydrochloride, 2,2'-azobis (2-amidinopropane) dihydrochloride, 2,2'-azobis (N,N'-dimethyleneisobutyramine), 2,2'-azobis(2-methyl-N-[1,1-bis(hydroxymethyl)-2-hydroxyethyl]propionamide, 2,2'-azobis (2-methyl-N-[1,1-bis(hydroxymethyl)ethyl]propionamide), 2,2'-azobis[2-methyl-N-(2-hydroxyethyl) propionamide], 2,2'-azobis(isobutyramide)dihydrate, 2,2'-azobis(2,2,4-trimethylpentane), 2,2'-azobis (2-methylpropane), dilauroyl peroxide, tertiary amyl peroxides, tertiary amyl peroxydicarbonates, t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, potassium peroxydisulfate, ammonium peroxydisulfate, di-tert butyl peroxide, di-t-butyl hyponitrite, dicumyl hyponitrite or combinations thereof. The template comprises non-reactive organic compound, non-reactive oligomer, non-reactive polymer, or combinations thereof.

The first organic solvent must dissolve the oxide gel and template simultaneously. It should be noted that the second organic solvent dissolves the template dispersed over the dry film, leaving the obtained organic/inorganic hybrid formed from condensation and polymerization of the oxide gel having polymerizable groups.

While essential ingredients in the composition are as disclosed, the inventive composition can be optionally admixed with an additive and a photo-curable resin. The additive is preferably present in an amount of 0.5 to 50 parts by weight and the template and the photo-curable resin preferably present in an amount of 0.1 to 50 parts by weight, based on 100 parts by weight of the oxide gel and the template. The additive can be planarization reagent, leveling agent, tackifier, filler, defoamer, or mixtures thereof. The photo-curable resin can be acrylic resin, epoxy resin, polyurethane resin, or combinations thereof, such as methyl acrylate, ethyl acrylate, isooctyl acrylate, methyl methacrylate, pentaerythritol triacrylate, 2-hydroxyl-ethyl acrylate, 2-hydroxyl-ethyl methylacrylate, 2-hydroxy propylacrylate, acrylamide, 1,6-hexanediol diacrylate, ethyleneglycol diacrylate, pentaerythritol tetraacrylate, ethoxylated pentaerythritol tetraacrylate, triethyleneglycol diacrylate, tripropyleneglycol diacrylate, neopentylglycol diacrylate, trimethylolpropane triacrylate, trimethylolpropane trimethacrylate, trimethylolpropane pentaerythritol triacrylate or combinations thereof.

Distribution and volume ratio of the nanopores are controlled by modifying the viscosity of composition and the weight ratio between the template and the oxide gel, to maintain dispersion of the template over the dry film under polymerization and condensation of the oxide gel rather than combination. As a result, polymer films having a porous profile can be obtained. Particularly, the viscosity of the composition is controlled within 5~100 CPS/25° C., preferably 5~50 CPS/25° C., and weight ratio between the oxide gel and the template controlled within 19:1 to 9:11, preferably 10:1 to 1:1.

The oxide gel having polymerizable groups not only undergoes self-condensation to form cross linkages (such as siloxane but also performs polymerization through the polymerizable groups, resulting inorganic/inorganic hybrids with high cross-link density. Since consisting essentially of organic/inorganic hybrids, the nanoporous film exhibits a superior mechanical strength and scratch resistance even though with nanopore volume ratio exceeding 40%.

Furthermore, phase separation is induced by condensation and polymerization of the oxide gel. In the fabrication according to the invention, the template is generally enclosed by organic/inorganic hybrid and dispersed uniformly over the dry film. The template is subsequently dissolved from the dry film by the second organic solvent, forming the nanoporous film with nanopores dispersed uniformly. Compatibility and weight ratio between the template and the oxide gel, and the viscosity of the composition are within a particular range, resulting in uniform nanopores distribution and controllable nanopore volume ratio of the obtained film. Since the nanopores are sufficiently filled by air, the polymer film has a refractive index less than 1.45, reducing the reflectivity thereof to less than 3.0%. Therefore, the nanoporous film of the invention can serve as an antireflection film.

The following examples are intended to demonstrate this invention more fully without limiting its scope, since numerous modifications and variations will be apparent to those skilled in the art.

EXAMPLE 1

3-methacrylicoxy propyl trimethoxy silane (MPTS), tetra-methoxy silane (TMOS), hydrochloric acid (HCl), and de-ion water ($H_2O$) were put into a bottle and dissolved in ethanol at 60° C., with mole ratio of MPTS, TMOS, HCl, $H_2O$, and ethanol is 0.25/0.75/0.1/4/15. After stirring for 3 hr, a silica gel A was obtained.

EXAMPLE 2

γ-glycidoxypropyl-trimethoxysilane, tetra-ethoxy silane (TEOS), hydrochloric acid (HCl), and de-ion water ($H_2O$) were put into a bottle and dissolved in ethanol at 60° C., with mole ratio of γ-glycidoxypropyl trimethoxysilane, TEOS, HCl, $H_2O$, and ethanol 0.3/0.7/0.05/4/50. After stirring for 3 hr, a silica gel B was obtained.

EXAMPLE 3

Vinyl triethoxysilane, tetra-ethoxy silane (TEOS), hydrochloric acid (HCl), and de-ion water ($H_2O$) were put into a bottle and dissolved in ethanol at 60° C., with mole ratio of γ-glycidoxypropyl trimethoxysilane, TEOS, HCl, $H_2O$, and ethanol 0.5/0.5/0.1/4/60. After stirring for 3 hr, a silica gel C was obtained.

EXAMPLE 4

3-methacrylicoxy-propyl trimethoxy silane (MPTS), colloid silica (sold and manufactured under the trade number of MAST by Nissan Chemical), hydrochloric acid (HCl), and de-ion water ($H_2O$) were put into a bottle and dissolved in ethanol at 70° C., with mole ratio of MPTS, colloid silica, HCl, $H_2O$, and ethanol 0.25/0.75/0.75/3/50. After stirring for 4 hr, a silica gel D was obtained.

COMPARATIVE EXAMPLE 1

Tetra-methoxy silane (TMOS), hydrochloric acid (HCl), and de-ion water ($H_2O$) were put into a bottle and dissolved in ethanol at 60° C., with mole ratio of TMOS, HCl, $H_2O$, and ethanol 0.75/0.042/4/72. After stirring for 3 hr, a siloxane A was obtained.

EXAMPLE 5

6 g silica gel A provided by Example 1 and 4 g poly-methylmethacrylate (PMMA) were put into a bottle and 500 g tetrahydrofuran at 25° C. After stirring, 0.2 g triphenyl triflate, as an initiator, was added into the mixture preparing a composition A, with the weight ratio between the silica gel having polymerizable group A and template 6:4, and the viscosity of the composition 10 CPS/25° C.

Next, composition A was coated on a glass substrate by spin coating at a speed of 2500 rpm for 30 sec. Next, the coating was baked at 60° C. for 3 min and exposed to a UV ray, forming a dry film by condensation and polymerization of MPTS and TMOS. Next, the dry film was immersed in n-hexane to dissolve and remove the PMMA, and a nanoporous film A was formed with a thickness of 150 nm and a refractive index of 1.28.

Afterward, the nanoporous film A exhibited reflectivity and transparency at a measured wavelength of 400~700 nm. Referring to FIGS. 12 and 13, the polymer film (g) has an average reflectivity of about 2% and an average transparency of about 96%.

EXAMPLE 6

7 g silica gel D provided by Example 4 and 3 g nematic liquid crystal (sold and manufactured under the trade number of E7 by Merck Co., Ltd) were put into a bottle and dissolved in 500 g tetrahydrofuran at 25° C. After stirring, 0.2 g triphenyl triflate, as an initiator, was added into the mixture preparing a composition B, with the weight ratio between the silica gel having polymerizable group A and template 7:3, and the viscosity of the composition 8 CPS/25° C.

Next, the composition B was coated on a glass substrate by spin coating at a speed of 2500 rpm for 30 sec. Next, the above coating was baked at 60° C. for 3 min and exposed to a UV ray. After heating on 120° C. for 30 min, a dry film was formed through condensation and polymerization. Next, the dry film was immersed in n-hexane to dissolve and remove the nematic liquid crystal, and a nanoporous film B was formed with a thickness of 150 nm and a refractive index of 1.31.

EXAMPLE 7

Example 7 was performed as Example 5 except for substitution of silica gel B provided by Example 2 for silica gel A provided by Example 1. Particularly, the weight ratio between silica gel B and PMMA was 6:4. The viscosity of the composition was 10 CPS/25° C. The obtained nanoporous film C has a thickness of 150 nm and a refractive index of 1.29.

EXAMPLES 8

Example 8 was performed as Example 5 except for substitution of silica gel C provided by Example 3 for silica gel A provided by Example 1. In addition, the weight ratio between silica gel C and PMMA was 7:3. The viscosity of the composition was 10 CPS/25° C. The obtained nanoporous film D has a thickness of 150 nm and a refractive index of 1.31.

EXAMPLE 9

4 g silica gel A provided by Example 1, 3 g nematic liquid crystal (sold and manufactured under the trade number of E7 by Merck Co., Ltd), and 3 g pentaerythritol triacrylate, as a photo-curable resin, were put into a bottle and 500 g tetrahydrofuran at 25° C. After stirring, 0.2 g triphenyl triflate, as an initiator, was added into the mixture preparing a composition E. The viscosity of the composition was 8 CPS/25° C.

Next, the composition was coated on a glass substrate by spin coating at a speed of 2500 rpm for 30 sec. Next, the coating was baked at 60° C. for 3 min and exposed to a UV ray. After heating on 120° C. for 30 min, a dry film was formed through condensation and polymerization. Next, the dry film was immersed in n-hexane to dissolve and remove the nematic liquid crystal, and a nanoporous film E was formed with a thickness of 150 nm and a refractive index of 1.39.

EXAMPLE 10

Example 10 was performed as Example 5 except for substitution of silica gel D provided by Example 4 for silica gel A provided by Example 1. The viscosity of the composition (silica gel dissolved in tetrahydrofuran) was 12 CPS/25° C. The obtained nanoporous film F has a thickness of 150 nm and a refractive index of 1.41.

COMPARATIVE EXAMPLE 2

6 g siloxane A provided by Comparative Example 1 and 4 g poly-methylmethacrylate (PMMA) were put into a bottle and dissolved in 500 g tetrahydrofuran at 25° C. Next, the composition was coated on a glass substrate by spin coating at a speed of 2500 rpm for 30 sec. Next, the above coating was baked at 60° C. for 3 min to form a dry film. Next, the dry film was immersed in n-hexane to dissolve and remove the PMMA, and a nanoporous film was formed with a thickness of 150 nm.

The hardness, adhesion, solvent-resistance, and haze of nanoporous films A-G were measured. The surface hardness of the nanoporous film was measured through a pencil hardness test conforming to Japan Industrial Standard (JIS) K5600.

The adhesion between the substrate and the nanoprous film was estimated by means of the cross-cut test conforming to JIS-K6801 (the symbol "⊚" indicates that all the films remained totally on the substrate; "X" indicates that at least one film was peeled off). The solvent resistance was estimated by dripping dropwise ethanol on the nanoporous film, and the change in the appearance was observed (the symbol "⊚" indicates that the films was unscathed completely; the symbol "X" indicates that the film was damaged or eroded by ethanol). The haze of the nanoporous film was measured by hazemeter (MODEL TC-HIII, which is a product of TOKYO DENSYOKU Co., Ltd). The result was shown in Table 1.

TABLE 1

| | Example 5 | Example 6 | Example 7 | Example 8 | Example 9 | Example 10 | Comparative Example |
|---|---|---|---|---|---|---|---|
| hardness | H | H | H | 2H | 2H | 2H | 4B |
| adhesion | ⊚ | ⊚ | ⊚ | ⊚ | ⊚ | ⊚ | X |
| solvent resistance | ⊚ | ⊚ | ⊚ | ⊚ | ⊚ | ⊚ | ⊚ |
| haze (%) | 1.5% | 2.1% | 1.9% | 1.8% | 1.7% | 1.8% | 1.2% |

The nanoporous film according to the present invention has a plurality of nanopores distributed uniformly therein. Due to the nanopores, the nanoporous film has a refractive index less than 1.45, reducing the reflectivity less than 3.0%. Accordingly, the nanoporous film has a pencil hardness exceeding F, and a haze of 0.1~35%. Compared to conventional siloxane nanoporous films (disclosed in Comparative Example 2), the nanoporous film comprises of organic/inorganic hybrid with a high crosslink density and exhibits superior mechanical strength and scratch resistance, suitable for use as anti-reflection and anti-abrasion coatings.

While the invention has been described by way of example and in terms of preferred embodiment, it is to be understood that the invention is not limited thereto. It is therefore intended that the following claims be interpreted as covering all such alteration and modifications as fall within the true spirit and scope of the invention.

What is claimed is:

1. A method for fabricating nanoporous film, comprising:
providing a substrate with a surface;
forming a coating of a composition on the surface, the composition comprising the following components as a uniform solution in a first organic solvent:
an oxide gel in an amount of 45 to 95 parts by weight, wherein the oxide gel comprises condensation products of at least one oxide gel precursor, and the at least one oxide gel precursor comprises a first oxide gel precursor having a formula (I), of $$_n(R^1)\text{—}M(OR^2)_m$$

wherein n and m are an integer equal to or more than 1, and the sum of n and m is equal to or more than 2; M is element of Group IIIB, element of Group IVB, element of Group VB, or transition metal; $R^1$ is alkenyl group, acrylic group, acryloyl group, amine group, alkoxy group, or isocyanato group; and $R^2$ is alkyl group or haloalkyl group;
a non-reactive polymer template in an amount of 5 to 55 parts by weight; and
an initiator in an amount of 1 to 10 parts by weight, based on 100 parts by weight of the oxide gel and the template;
curing the coating to condense and polymerize the oxide gel, thereby forming an organic/inorganic hybrid film and inducing a phase separation between polymer template and the condensed and polymerized oxide gel; and
dissolving the polymer template from the organic/inorganic hybrid film by a second organic solvent to leave the nanoporous film with three-dimensional nanopores.

2. The method as claimed in claim 1, wherein the first oxide gel precursor comprises 3-methacrylicoxy propyl trimethoxy silane (MPTS), 3-thiocyanatopropyl triethoxy silane, 3-amino-propyltriethoxysilane, tetraethoxy silane, vinyl triethoxy silane (VTES), vinyl trimethoxy silane, or combinations thereof.

3. The method as claimed in claim 1, wherein the at least one oxide gel precursor further comprises a second oxide gel precursor having a formula (II), of $$_x(R^3)\text{-}M(OR^3)_y$$

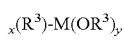

wherein x is an integer equal to or more than 0, y is an integer equal to or more than 1, and the sum of x and y is equal to or more than 2;
M is element of Group IIIB, element of Group IVB, element of Group VB, or transition metal; and
$R^3$ are the same or different and alkyl group or haloalkyl group.

4. The method as claimed in claim 3, wherein the second oxide gel precursor comprises tetramethoxysilane (TMOS), tetraethoxysilane (TEOS), methyl triethoxysilane (MTES), dimethyl dimethoxysilane, ethyl triethoxysilane, tetrapropoxysilane (TPOS), tetrabutoxysilane (TBOS), or combinations thereof.

5. The method as claimed in claim 1, wherein the composition has a viscosity of 5~100 CPS/25° C.

6. The method as claimed in claim 1, wherein the weight ratio between the oxide gel and the template is 19:1 to 9:11.

7. The method as claimed in claim 1, wherein the composition further comprises an additive in an amount of 0.5 to 50 parts by weight, based on 100 parts by weight of the oxide gel and the template, wherein the additive comprises planarization reagent, leveling agent, tackifier, filler, defoamer, or combinations thereof.

8. The method as claimed in claim 1, wherein the substrate is a transparent substrate.

9. The method as claimed in claim 1, wherein the composition further comprises a photo-curable resin in an amount of 0.1 to 50 parts by weight, based on 100 parts by weight of the oxide gel and the template.

* * * * *